US009641947B2

(12) United States Patent
Loether

(10) Patent No.: US 9,641,947 B2
(45) Date of Patent: May 2, 2017

(54) COMMUNICATION SYSTEM AND METHOD

(71) Applicant: Jeff Loether, Germantown, MD (US)

(72) Inventor: Jeff Loether, Germantown, MD (US)

(73) Assignee: IDEAWORKX LLC, Gaithersburg, MD (US)

(*) Notice: Subject to any disclaimer, the term of this patent is extended or adjusted under 35 U.S.C. 154(b) by 141 days.

(21) Appl. No.: 14/615,277

(22) Filed: Feb. 5, 2015

(65) Prior Publication Data

US 2015/0230025 A1 Aug. 13, 2015

Related U.S. Application Data

(60) Continuation-in-part of application No. 13/191,172, filed on Jul. 26, 2011, now abandoned, which is a division of application No. 11/806,774, filed on Jun. 4, 2007, now Pat. No. 7,991,163.

(60) Provisional application No. 60/810,137, filed on Jun. 2, 2006, provisional application No. 60/810,142, filed on Jun. 2, 2006, provisional application No. 60/810,141, filed on Jun. 2, 2006, provisional application No. 60/810,410, filed on Jun. 2, 2006, provisional application No. 60/810,139, filed on Jun. 2, 2006, provisional application No. 60/810,138, filed on Jun. 2, 2006.

(51) Int. Cl.
*H04B 5/00* (2006.01)
*H04R 27/00* (2006.01)
*H04R 1/40* (2006.01)

(52) U.S. Cl.
CPC ............... *H04R 27/00* (2013.01); *H04R 1/40* (2013.01); *H04R 2420/07* (2013.01); *H04R 2430/01* (2013.01)

(58) Field of Classification Search
CPC ........ H04R 2227/003; H04R 2227/005; H04R 2420/07; H04R 2499/13; H04R 2499/15; H04R 29/001; H04R 29/004; H04R 29/008; H04R 3/005; H04R 5/02; H04S 7/301; H04S 2400/11; H04S 3/008; H04S 7/302; H04S 7/303; H04S 7/40; G10K 11/178; G10K 2210/108
USPC ..... 381/26, 1, 2, 92, 123, 91, 94.1–94.5, 57, 381/300, 81, 77, 76, 79; 700/94; 348/14.1, 14.01–14.09; 379/14.1, 11–16
See application file for complete search history.

(56) References Cited

U.S. PATENT DOCUMENTS

| | | | | |
|---|---|---|---|---|
| 5,335,011 A * | 8/1994 | Addeo | H04N 7/15 | 348/14.1 |
| 6,654,588 B2 * | 11/2003 | Moskowitz | G09B 5/00 | 434/323 |
| 7,227,566 B2 * | 6/2007 | Abe | H04N 7/15 | 348/14.05 |
| 7,991,163 B2 * | 8/2011 | Loether | H04R 27/00 | 348/14.01 |
| 8,457,614 B2 * | 6/2013 | Bernard | H04M 1/6033 | 455/416 |

(Continued)

*Primary Examiner* — Lao Lun-See
(74) *Attorney, Agent, or Firm* — Florek & Endres PLLC

(57) ABSTRACT

A system and method for generating, transmitting and distributing audio signals providing automatic adjustments to the audio signals to compensate for one or more of the acoustics in a meeting room, the arrangement of audience arrays and speakers in a meeting room, audio signal volume levels and equalization, and the differences in characteristics of a verbal input.

20 Claims, 7 Drawing Sheets

(56) References Cited

U.S. PATENT DOCUMENTS

| | | | | |
|---|---|---|---|---|
| 2001/0016046 | A1* | 8/2001 | Ohta | H04S 7/301<br>381/98 |
| 2003/0023444 | A1* | 1/2003 | St. John | H04M 3/382<br>704/270.1 |
| 2003/0059061 | A1* | 3/2003 | Tsuji | H04M 3/569<br>381/92 |
| 2005/0190929 | A1* | 9/2005 | Sporer | H04R 3/02<br>381/93 |
| 2010/0272270 | A1* | 10/2010 | Chaikin | H04R 29/008<br>381/59 |

* cited by examiner

COMMUNICATION SYSTEM AND METHOD

REFERENCE TO RELATED APPLICATIONS

This application is a continuation in part of U.S. patent application Ser. No. 13/191,172, filed Jul. 26, 2011, which is a divisional application of U.S. patent application Ser. No. 11/806,774, filed on Jun. 4, 2007, now U.S. Pat. No. 7,991,163, which claims priority to U.S. Provisional Application 60/810,137, filed Jun. 2, 2006, U.S. Provisional Application No. 60/810,142, filed Jun. 2, 2006, U.S. Provisional Application No. 60/810,141, filed Jun. 2, 2006, U.S. Provisional Application No. 60/810,410, filed Jun. 2, 2006, U.S. Provisional Application No. 60/810,139, filed Jun. 2, 2006, U.S. Provisional Application 60/810,138, filed Jun. 2, 2006. Each is incorporated by reference in its entirety.

FIELD OF THE INVENTION

This application relates generally to the field of sound transmission and more particularly to the transmission and broadcast of sound in communicative environments.

BACKGROUND OF THE INVENTION

The background for this application relates generally to the field of electro-acoustics and more specifically to an invention that is made of both an apparatus for detecting and amplifying sound and processes for enhancing verbal communications among meeting attendees and between meeting attendees and presenters. The opportunity arises out of meetings in the hospitality industry. Most meetings are presentation style with a presenter at the front of the room and an audience in a meeting space.

Many of these meetings and presentations involve a meal with a presenter addressing the entire group. The audience can be seated at round tables for food service and the presenter may be on a platform at one end of the room. This is a common and profitable arrangement for hotels, as they are often able to sell both the meeting room and food for the audience members.

There is a desire during these presentations to provide sound reinforcement so that the audience can hear the presenter and any program audio from video or other presentation materials. This can be provided by having the presenter either hold or wear a microphone that is connected to speakers. Additionally, there is a desire to accommodate questions, comments and statements from the audience after a presenter has concluded their discussion, in a way that can be heard by both the presenter and the audience. This can be accommodated by providing one or more microphones on stands in the audience area and requiring audience members to approach the microphones to ask their questions. Alternatively, wired or wireless portable microphones can be brought into the audience for questions to be asked so everyone can hear the questions or comments.

These microphones are connected to amplifiers and speakers in order to provide sound for the audience. Two of the typical ways this may be provided are by using a built-in sound system or by using portable speakers.

Currently, the highest level of spoken word intelligibility and sound quality is garnered though sound reinforcement systems having an array of ceiling speakers distributed throughout the listening area and properly installed, located and adjusted. Using this approach, an array of ceiling speakers can be installed flush, embedded into, or mounted on the surface of the ceiling. These can be connected to amplifiers either located nearby or in a central location. Input jacks can then be built into the walls around the periphery of the meeting space.

Portable speakers can typically be mounted on tripod stands and located at the front corners of the object wall or front of the room. The microphones can be connected to portable amplifiers, or the amplifiers may be built into the speakers. Cables can run from the amplifiers or microphones to the speakers.

Typical built-in hotel sound systems, however, lack the desired high quality sound transmission and intelligibility. Systems that are built-in to hotels when the hotels are constructed or renovated tend to be either low in quality or outdated, due to the difficulty and cost in updating the systems. Thus, it is often desired by meeting and presentation planners to avoid using the built-in systems of hotels.

Further, many hotels and conference centers rely on outside audio/visual rental companies to provide audio/visual services. These audio/visual companies often try to convince clients to use portable sound systems and equipment that is not built-in to the hotel. These systems often use portable speakers that are placed in the front of the room where the presentation is staged. However, using portable speakers in this fashion can result in a variety of problems or undesirable effects. For example, the portable speakers may not provide a high-quality listening experience for the audience members of a presentation. In these situations, the audience members seated nearest the speakers may be subjected to an uncomfortably high level of noise, while those seated in the rear may struggle to hear or understand the speaker due to a potentially low level of sound.

Additionally, portable speakers that face horizontally often project most of their sound energy against the walls and ceiling of the presentation room, energizing the reverberant spaces and thus reducing the intelligibility and quality of the words of the speaker due to the reverberation of the sound energy. This effect may further be exacerbated due to the acoustics of the meeting space.

Other problems caused by the use of traditional portable speakers for presentations include both safety and aesthetic dangers. Cables running to the portable speakers can create a tripping hazard for both presenters and guests. Further, the presenters and planners may not like the appearance of temporary, portable speakers in an otherwise aesthetically pleasing presentation environment.

Additional problems exist when there is a panel of presenters for a presentation. In these situations a variety of microphones need to be placed on a table on a dais so that each member of the panel may be heard by the audience without having to share a microphone or microphones. This set up may cause additional problems, such as difficulty in connecting a series of microphones to a speaker system and the large amount of wiring needed to support a variety of microphones.

Another problem that exists in present systems is the manner in which the system is controlled. Current systems may rely on a centralized or remote control unit. However, this control unit may not be configured to accept different microphone and speaker setups or may not be configured to provide an ideal output for different setups.

Further, with traditional presentation setups, there are typically only a few microphones that may be used by audience members to ask questions or make comments after the presenters have finished their discussions. This can be inconvenient as audience members may have to walk through tightly arranged tables and chairs or rows of chairs in order to reach one of the microphones. Additionally, these setups are typically not convenient for people with disabilities, who may require a significant amount of time or effort to reach the microphone. Additionally, people who feel uncomfortable when standing and speaking in front of a large audience may be discouraged from asking their question or proffering their comment.

Other systems that have been used in conference or presentation situations include pre-wired tables that include both microphones and speakers. These tables are manufactured to include a series of speakers and one or more microphones, allowing for each group of people at a table to set the volume of the presentation and allowing for them to speak through the speaker system through the embedded microphones. These pre-wired tables are, however, expensive to manufacture and frequently inadequate for presentation use. The pre-wired tables are difficult to move and store due to their size and weight. Additionally, the tables are not convenient for hotels to purchase because the weight of the tables and incorporated electrical equipment do not make them ideal for simpler functions, such as dinner parties that do not need communication or presentation systems.

Other systems that have been used in conference or presentation situations include wireless units that include both microphones and speakers. These are designed to serve one or at most two attendees and include a speaker and a microphone, allowing for one or two attendees to hear and speak. These wireless systems are generally too expensive to use in a hotel setting.

Yet other presentation systems rely on individualized headsets in order to convey a presenter's speech to individuals in the audience. Individual headsets may be worn by each member of an audience who seeks to hear the presentation and the volume on the headsets may be adjusted to an appropriate level. These headsets, however, are subjected to easy breakage from users dropping them, for example. Further, each person in attendance must be given a headset if they desire to adequately hear a presenter, thus there may be gridlock at entrances to the presentation or staff must be used to place headsets at each seat. Additionally, it may be difficult for the hotel or audio/visual company who owns the headsets to successfully recover all of the headsets following a presentation or conference. Finally, some users may find the headsets uncomfortable, awkward to wear or difficult to use and adjust. In addition, these devices typically do not have a way to encrypt the data that is being transmitted, thus the presenters do not have adequate control over how to disseminate their presentation material.

Still other systems utilize individualized badges or lapel microphones. These devices are typically battery-powered and wireless. However, these devices require both distribution to the users as well as user interaction, such as connecting the microphone to their clothing, which limits the effectiveness of the devices. Further, some of these devices require a user to wear a battery pack which may be cumbersome for a user to wear.

SUMMARY OF THE INVENTION

According to at least one exemplary embodiment an audio system may include an array having a plurality of microphones and a plurality of speakers. The audio system may also include a first processor disposed proximate the array and a second processor disposed remotely from the array and communicatively coupled with the array and the first processor. The audio system may further include at least one remotely located device having at least one microphone and at least one speaker and one or more remotely located speakers. Additionally, the audio system may include an audio signal that is generated by one of a microphone on the array and a microphone on the at least one remotely located device, a location of the generation of the audio signal determined by one of the first processor and the second processor, generated audio signal transmitted to at least one of the speakers on the array, the at least one speaker on the remotely located device and the one or more remotely located speakers.

An exemplary method of distributing an audio signal may include generating an audio signal with a microphone and inputting the audio signal into a device having a digital signal processor. The digital signal processor then determines the origin location of the audio signal. The method may also include outputting the audio signal to one or more speakers located remotely from the origin location of the audio signal and disabling one or more speakers located substantially proximate the origin location of the audio signal. Additionally, the method may include disabling one or more microphones substantially remote from the origin location of the audio signal.

According to another exemplary embodiment, an audio signal distribution system may include a first communication device having a plurality of microphones and speakers arranged in an array. The audio distribution system may also include a processor that determines the location of the microphone of an input audio signal and distributes the audio signal to speakers located substantially remote to the location of the microphone on the array.

The system can further include at least a second communication device having at least one microphone and at least one speaker where the at least second communication device may be communicatively coupled to the first communication device and any other communication devices having at least one microphone and one speaker by a central control unit.

Additionally, the central control unit may be capable of routing an audio signal generated by the at least one microphone on the at least second communication device to the first communication device, deactivating speakers on the first communication device and the at least second communication device and deactivating microphones on the first communication device and the at least second communication device.

An exemplary method for communicating may include means to generate an audio signal and means to transmit the generated audio signal to an output device located remotely from the location where the audio signal was generated. Additionally, the method may include means to prevent the generation of other audio signals when the generated audio signal is being transmitted.

The preferred digital signal processor is adapted to automatically analyze connected speakers and adjust its equalization to compensate for different speaker voicing characteristics by comparing responses to test signals from connected microphones with a pre-defined response based on predetermined parameters.

The digital signal processor is also preferably adapted to automatically calibrate microphones receiving an audio signal input. The method may include the selection of preset equalization curves that are matched to one or more microphones receiving the audio signal input, and also preferably includes a comparison of test signals to connected speakers and from connected microphones with signals from one or more microphones receiving the audio signal input based on predetermined parameters.

The digital signal processor is also preferably adapted to automatically adjust volume levels throughout the audio system to provide maximum gain and the reduction of feedback based on the monitoring of frequency response of connected microphones. The method may include generating a test signals to connected speakers to excite a reverberant state of a meeting room followed by activating microphones one by one, increasing levels until a sine wave oscillation is detected, and then attenuating the frequency of the oscillation to reduce feedback.

Additionally, the digital signal processor may be adapted to automatically adjust and compensate for the acoustics in a meeting room to emphasize verbal audio input over background noise by detecting levels and characteristics of the background noise in an unoccupied meeting room.

The digital signal processor is further preferably adapted to automatically adjust and compensate for sound from the originating verbal input to provide a psychoacoustic precedence effect, i.e., a "Haas Effect," wherein the sound appears to be coming from the visible source rather than from the connected speakers. The system would monitor the responses to test signals of connected speakers in relation to their distance to an originating verbal input and select an appropriate amount of audio signal delay according to pre-determined parameters to create the aural illusion of a direct sound field coming from the originating verbal input rather than from the connected speakers.

The digital signal processor is also preferably adapted to provide a graphic map of time and distance of connected microphones and speakers relative to each other on an electronic device.

BRIEF DESCRIPTION OF THE DRAWINGS

Advantages of embodiments of the present invention will be apparent from the following detailed description of the exemplary embodiments thereof, which description should be considered in conjunction with the accompanying drawings in which.

DETAILED DESCRIPTION OF THE PREFERRED EMBODIMENTS

Figure 1A:
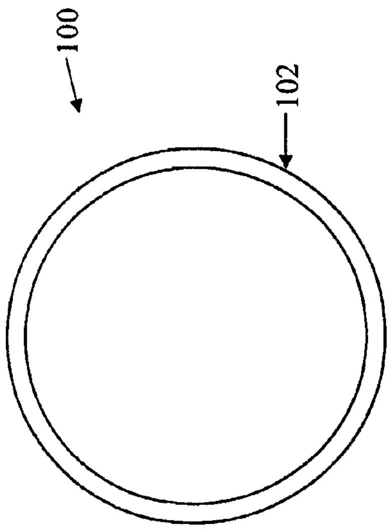
FIG. 1A is an exemplary top down section view of a communication device.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the terms "embodiment(s) of the invention," "alternative embodiment(s)," and "exemplary embodiment(s)" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Additionally, some exemplary embodiments include network adapters that may also be coupled to the system to enable the data processing system to become coupled to other data processing systems or remote printers or storage devices through intervening private or public networks. Modems, cable modems and Ethernet cards are just a few of the currently available types of network adapters.

Also, exemplary embodiments may include or incorporate at least one database which may store software, descriptive data, system data, digital images and any other data item required by the other components necessary to effectuate any embodiment of the present system and method known to one having ordinary skill in the art. The databases may be provided, for example, as a database management system (DBMS), a relational database management system (e.g., DB2, ACCESS, etc.), an object-oriented database management system (ODBMS), a file system or another conventional database package as a few non-limiting examples. The databases can be accessed via a Structure Query Language (SQL) or other tools known to one having skill in the art.

FIG. 1 shows one exemplary embodiment of a communication device having a radial array of microphones and speakers. Communication device 100 may further include signal processing capabilities, one or more batteries and two-way secure wireless transmission capabilities. In some exemplary embodiments, communication device 100 may be able to receive data signals from a remotely located communication device and may be able to output audio signals from a remote device. Further, communication device 100 may be able to transmit data, for example audio signals, to any of a variety of remotely located communication devices, such as any of the communication devices shown in FIG. 4. Communication device 100 may be any of a variety of dimensions, for example it may have a diameter of about 20 inches and a height of about 4 inches. Any digital signal processing capabilities of communication device 100 may be performed by a digital signal processor (DSP) system that may provide level adjustment, such as compression, limiting, expansion, and automatic gain control (AGC).

A DSP system may also provide common mode noise attenuation, noise gating, muting, automatic microphone mixing, echo cancellation, bandpass equalization, and signal routing including mix-minus. Communication device 100 may also have a light emitting diode (LED) indicator or indicators, or some form of display used to communicate visual data. An indicator or indicators may be capable of providing signals to a user of communication device 100, for example a signal indicating that a microphone is either active or inactive or a signal indicating that an audio signal is being outputted. In addition, other configurations of communication device 100 may be utilized to make it more aesthetically pleasing and to accommodate table decorations. For example, communication device 100 may have any size or shape depending on an application or use. In some exemplary embodiments a larger or smaller communication device 100 may be utilized depending on the size of a table or the distance between people who may be using communication device 100. In yet another exemplary embodiment, communication device 100 may include detachable or semi-detachable components, such as speakers or microphones, which may be detached or partially detached from communication device 100 so as to allow for still other configurations. Also, an outer casing 102 may formed out of any material known to one having ordinary skill in the art and can include any aesthetic design or color.

Figure 1B:
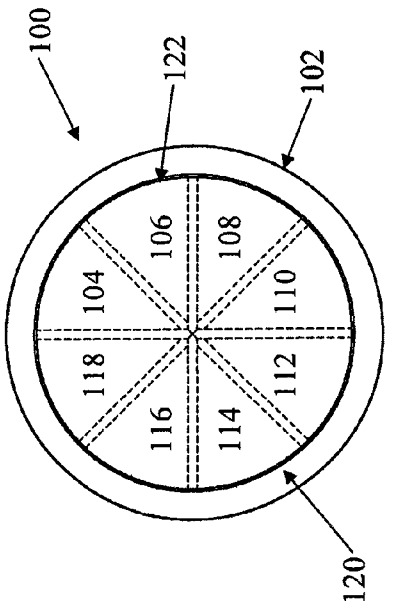
FIG. 1B is another exemplary top down view of a communication device.

In another exemplary embodiment shown in FIG. 1B, a number of dividers may be disposed on communication device 100. Communication device 100 may include dividers 104, 106, 108, 110, 112, 114, 116 and 118. Dividers 104-118 may be disposed on or associated with communication device 100 in such a manner as to provide, for example, eight separate segments. Dividers 104-118 may act to provide a separation between segments, for example to prevent distortion or confusion of an audio signal being inputted or outputted from a portion of communication device 100. Dividers 104-118 may be any size, for example 0.5 inches thick and may extend to any length, for example 1 inch from the periphery of communication device 100. Additionally, dividers 104-118 may be made out of any material, for example the same material as casing 102 or any other material known to one having ordinary skill in the art, such as plywood. In still other exemplary embodiments, any number of dividers may be used to provide any number of different segments. In a further exemplary embodiment, a microphone or a speaker or both may be provided in each segment. Thus, as shown in FIG. 1B, a microphone and speaker may be provided between divider 104 and divider 106, between divider 106 and divider 108, and so forth on communication device 100. If a speaker or microphone is provided in each of the segments of communication device 100, dividers 104-118 may act to assist an individual in front of a microphone or speaker with sound that may be amplified in their direction as well as enhancing the ability of an individual to use a particular microphone. Additionally, dividers 104-118 may assist in allowing individuals located at different positions of communication device 100 to speak to each other using a microphone disposed between two dividers, as well as assist each other in hearing sound emitted from a speaker between two dividers.

In yet another exemplary embodiment, shown in FIG. 1B, screen 120 may be disposed on communication device 100. In one example, screen 120 may be mounted in groove 122. Screen 120 may serve to protect and conceal the working elements of communication device 100. For example, if communication device is placed in an area where users of the device may be eating, screen 120 may protect the working elements of device 100 from any debris or splashes.

Figure 1C:
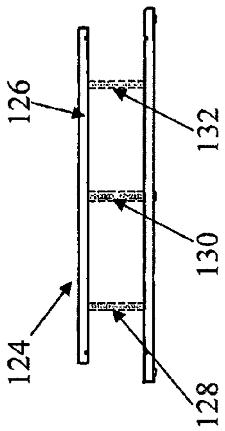
FIG. 1C is an exemplary cross sectional view of a communication device.

FIG. 1C shows another exemplary top-down view of communication device 100. In this view, communication device 100 may be oriented in a linear fashion, as opposed to the exemplary circular layout shown above. Additionally, it should be noted that any orientation of microphones and speakers for a communication device may be utilized. Thus, in this exemplary embodiment, any number of dividers may be used to provide any desired amount of separation between proximate sections in a linear array. Also, as described in more detail with respect to other exemplary embodiments, various components of communication device 100 may be disposed in any section of the device and may be activated or deactivated to provide different communication functions. For example, casing 124 may be disposed on an outside portion of the communication device. Casing 124 may also include screen 126, which may protect internal components of the communication device from outside debris, similar to the embodiment described previously. Also, in this exemplary embodiment, dividers 128, 130 and 132 may be disposed on the communication device. Dividers 128, 130 and 132 may separate a microphone from a speaker or may separate a first microphone and speaker combination from a second microphone and speaker's configuration, and so on. Additionally, in further exemplary embodiments, any number of dividers may be used on a communication device and any number of microphones and speakers may be separated by the dividers. In still further exemplary embodiments, any number of dividers may be used to separate any number of microphone and speaker combinations from other microphone and speaker combinations.

In another exemplary embodiment, shown in FIG. 2, some of the functionality of communication device 100 may be shown. In this exemplary embodiment, communication device 100 may have eight segments, 202, 204, 206, 208, 210, 212, 214 and 216, however any number of segments may be formed and any number of components may be associated with each segment. Each segment may be formed using a divider, as described previously, or may be formed in any other manner known to one having ordinary skill in the art. Alternatively, the segments may be formed without any form of dividing wall there between. Also, in some exemplary embodiments, a microphone or a speaker or a microphone and speaker may be disposed in each segment 202-216. In the exemplary embodiment shown in FIGS. 2A-2D, segment 202 may include microphone M1, segment 204 may include speaker S1, segment 206 may include microphone M2, segment 208 may include speaker S2, segment 210 may include microphone M3, segment 212 may include speaker S3, segment 214 may include microphone M4 and segment 216 may include speaker S4.

Figure 2A:
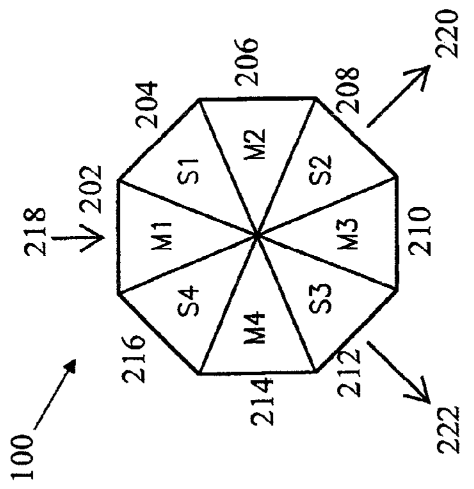
FIG. 2A is an exemplary diagram showing signal inputs and outputs from a communication device.

In a further exemplary embodiment, DSP, as described previously, can route a variety of signals in a variety of manners. For example, a signal from a microphone may be routed to two or more speakers. As shown in FIG. 2A, input signal 218, which may be any input, for example a person's voice, may be input into microphone M1. DSP in communication device 100 may route input signal 218 from microphone M1 to speakers S2 and S3. Speakers S2 and S3 may generate output signals 220 and 222, respectively, which may be audio signals. In this exemplary embodiment, input signal 218 is not sent to speakers S1 or S4, for example to limit any potential feedback into microphone M1 or because any people located proximate to a person speaking into microphone M1 may be able to sufficiently hear that person without the aid of amplification. However, in other exemplary embodiments, input signal 218 may be outputted through speakers S1 and S4 in addition to speakers S2 and S3, or any combination of speakers S1-S4.

Figure 2B:
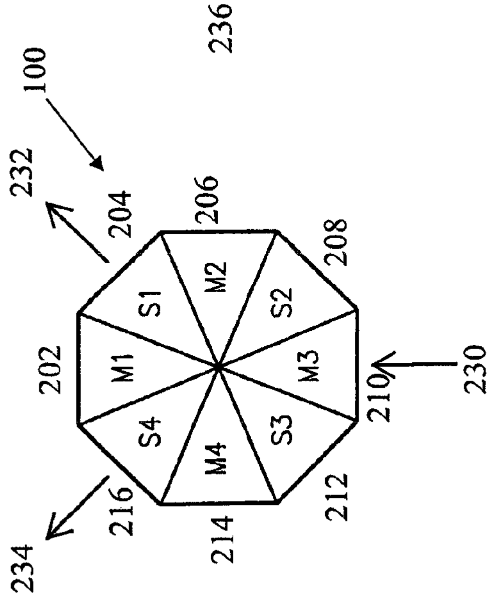
FIG. 2B is another exemplary diagram showing signal inputs and outputs from a communication device.
Figure 2C:
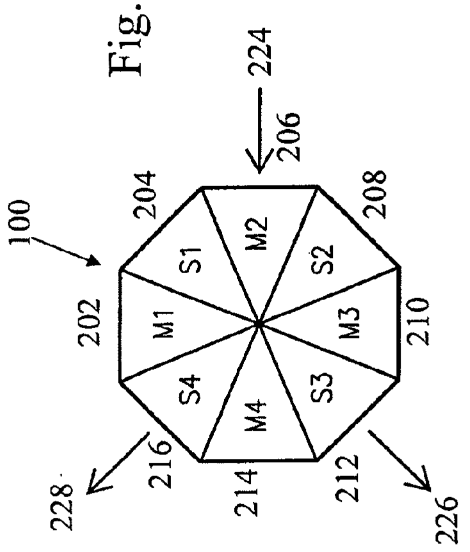
FIG. 2C is another exemplary diagram showing signal inputs and outputs from a communication device.

In another exemplary embodiment, as shown in FIG. 2C, input signal 224 may be generated through the use of microphone M2. DSP in communication device 100 may then route input signal 224 to speakers S3 and S4, which may produce output signals 226 and 228, respectively. Similar to the previous embodiment, input signal 224 may not be routed to the speakers adjacent to the microphone that generates the input signal. Thus, in this exemplary embodiment, input signal 224 is not routed to speakers S1 and S2, although, in other exemplary embodiments, input signal 224 may be routed to speakers S1 and S2, in addition to speakers S3 and S4, as well as any combination of speakers S1-S4.

In another exemplary embodiment, as shown in FIG. 2B, input signal 230 may be generated through the use of microphone M3. DSP in communication device 100 may then route input signal 230 to speakers S1 and S4, which may produce output signals 232 and 234, respectively. Similar to the previous embodiment, input signal 230 is not routed to the speakers adjacent to the microphone that generates the input signal. Thus, in this exemplary embodiment, input signal 230 is not routed to speakers S2 and S3, although, in other exemplary embodiments, input signal 230 may be routed to speakers S2 and S3, in addition to speakers S1 and S4, as well as any combination of speakers S1-S4.

Figure 2D:
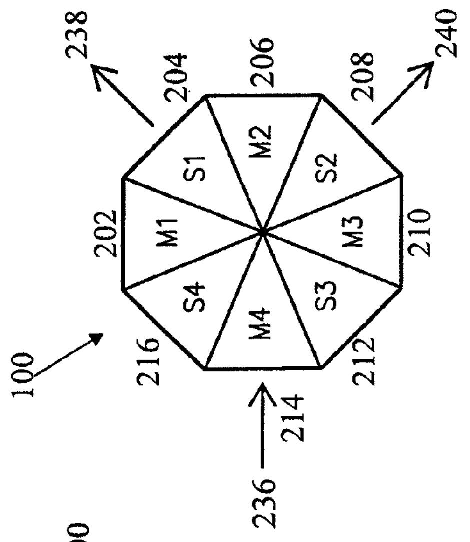
FIG. 2D is yet another exemplary diagram showing signal inputs and outputs from a communication device.

In still another exemplary embodiment, as shown in FIG. 2D, input signal 236 may be generated through the use of microphone M4. DSP in communication device 100 may then route input signal 236 to speakers S1 and S4, which may produce output signals 238 and 240, respectively. Similar to the previous embodiment, input signal 236 is not routed to the speakers adjacent to the microphone that generates the input signal. Thus, in this exemplary embodiment, input signal 236 is not routed to speakers S3 and S4, although, in other exemplary embodiments, input signal 230 may be routed to speakers S3 and S4, in addition to speakers S1 and S2, as well as any combination of speakers S1-S4.

Figure 3:
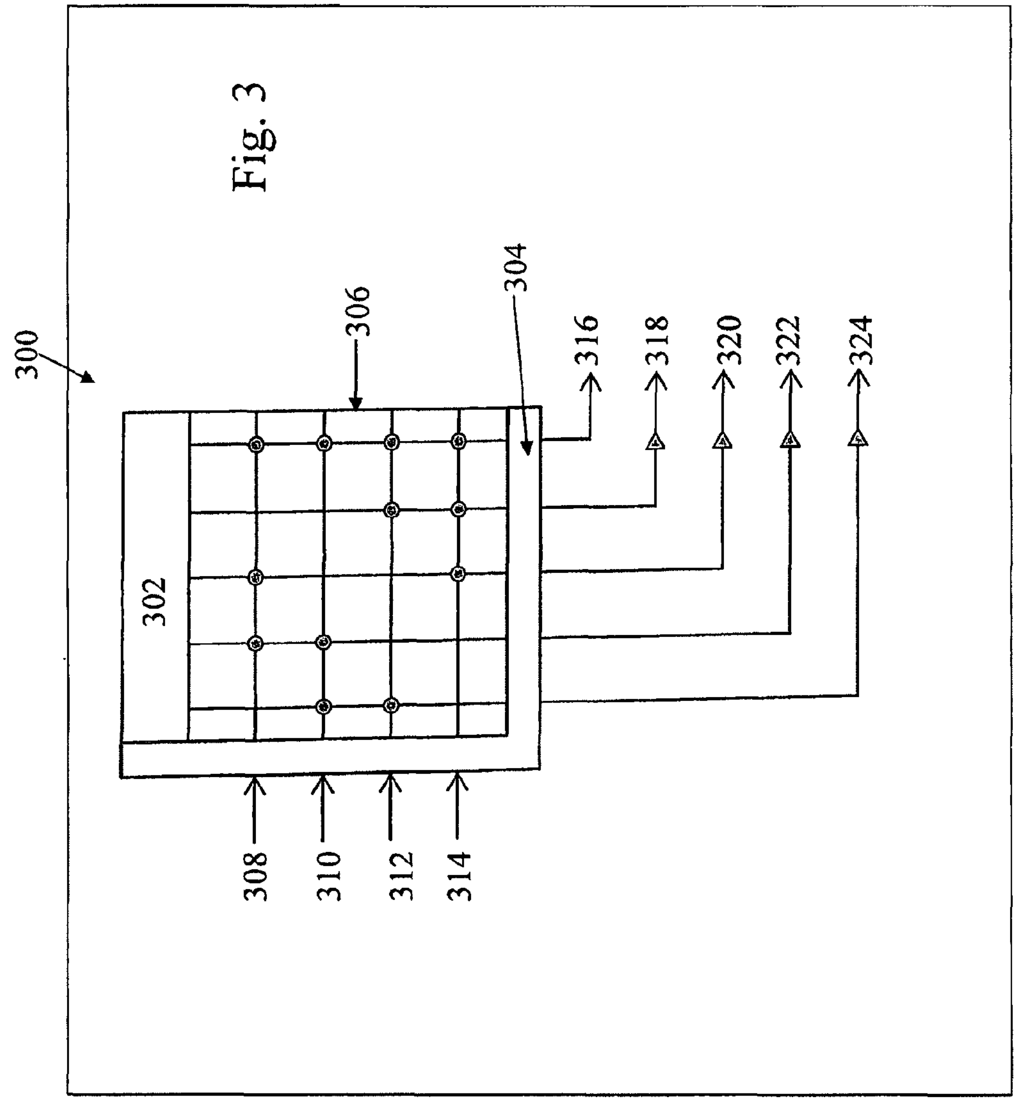
FIG. 3 is an exemplary diagram showing a DSP logic array.

FIG. 3 shows an example of an audio signal flow diagram for a communication device. The audio signal flow diagram 300 may show a mix-minus flow of an audio signal through communication device 100. Audio signal flow diagram 300 may also be interpreted to pertain to any other communication device having at least two microphones and at least two speakers. As shown in FIG. 3, an audio input, for example, audio input 308, 310, 312 or 314 may be inputted through the use of a microphone, similar to previously described exemplary embodiments. Audio data 302 may then be routed to one or more desired outputs by a control unit, for example a control unit inside the communication device 100. Audio data 302 may also be an audio signal received from an outside source, for example an audio signal from another communication device, for example any of the communication devices described with respect to FIG. 4. DSP 304 may determine the microphone that provided an audio input signal then route one or more signals to, for example, any number of speakers or any other desired device. In one example, a microphone M1 may provide audio input 308. Audio input 308 may be converted internally into audio data 302 and distributed by DSP 304. Here, DSP routing matrix 306 may demonstrate that audio input 308 may be sent to a speaker S2, as output signal 320, and to speaker S3, as output signal 322. Additionally, an audio output signal, such as output 316, may be sent to a control unit, which may be a control unit located remotely from communication device 100, as shown in FIG. 5. Output 316 may be sent from the remotely located control unit to any other desired location, for example other communication devices having speakers or any other remotely located speaker device.

In another example, a microphone M2 may provide audio input 310. Similar to the previous embodiment, audio input 310 may be converted by a control unit into audio data 302. Additionally, DSP routing matrix 306 can show that audio input 310 may be sent to a variety of speakers. Here, audio input 310 may be sent to speaker S3, as output signal 322, and speaker S4, as output signal 324. In yet another example, a microphone M3 may provide audio input 312. Similar to the previous embodiment, audio input 312 may be converted by a control unit into audio data 302. Additionally, DSP routing matrix 306 can show that audio input 312 may be sent to any of a variety of speakers. Here, audio input 312 may be sent to speaker S1, as output signal 318, and speaker S4, as output signal 324. In still another example, a microphone M4 may generate audio signal 314. Similar to the previous embodiment, audio input 314 may be converted by a control unit into audio data 302. Additionally, DSP routing matrix 306 can show that audio input 314 may be sent to a variety of speakers. Here, audio input 314 may be sent to speaker S1, as output signal 318, and speaker S2, as output signal 320. Therefore, in one exemplary embodiment, people seated at the table around communication device 100 may be able to effectively speak to each other, as their voices can be picked up from microphones mounted near a speaker and transmitted to the speakers nearest people opposite the person speaking. It should be noted, however, that DSP routing matrix 306 is just one example of how an audio signal generated by a microphone may be routed and that any combination of input signals that are generated may lead to any combination of outputted signals.

Figure 4:
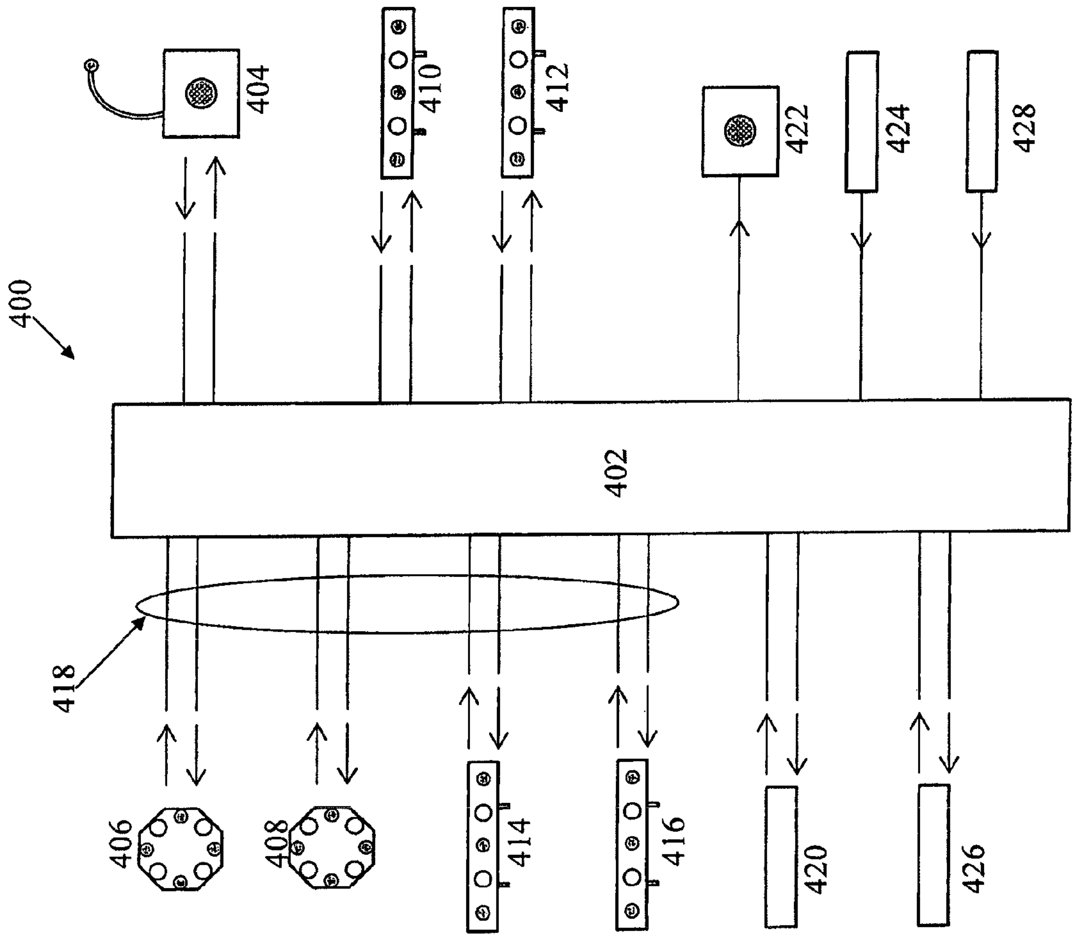
FIG. 4 is an exemplary diagram showing a communication system.
Figure 5:
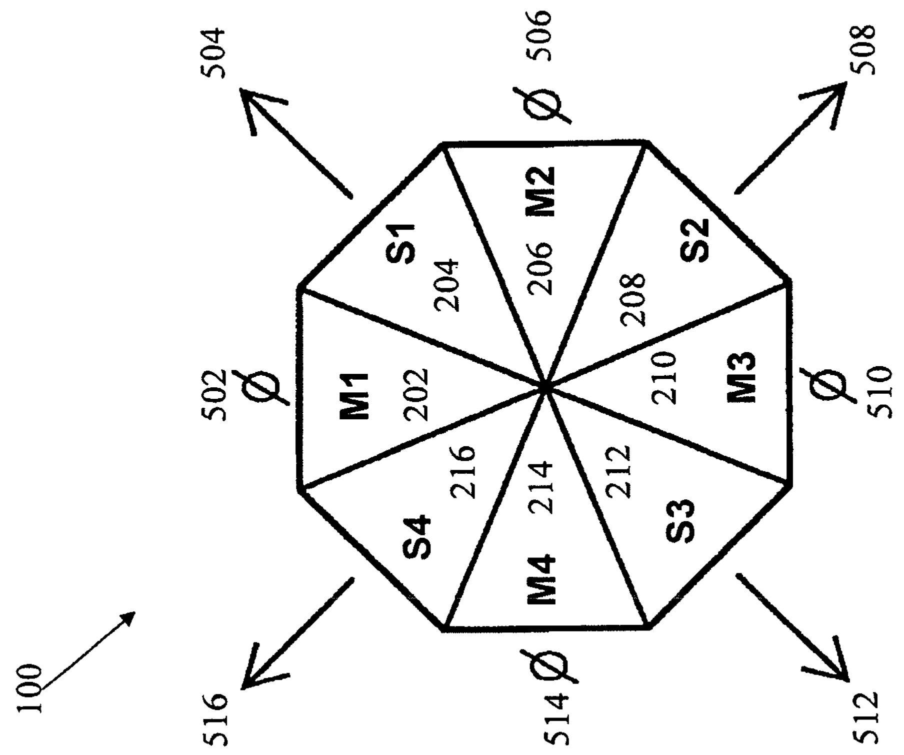
FIG. 5 is another exemplary diagram showing signal inputs and outputs from a communication device.

FIG. 4 shows another exemplary embodiment of a communication system. In this embodiment, communication system 400 may include any of a variety of components. For example, control unit 402 may be a centrally located processing unit that may perform a variety of functions, including the routing of audio signals and other data to various components of communication system 400. System 400 may also include a variety of communication devices. The communication devices may include tabletop communication devices 406 and 408, which may be similar to communication device 100 described previously. Also, presenter's communication device 404, panel communication devices 410 and 412 and linear tabletop communication devices 414 and 416. Panel communication devices 410 and 412 and tabletop communication devices 414 and 416 may have similar functionality to communication device 100 described previously, although they may be oriented in a linear fashion, as opposed to the generally circular fashion described above. However, it should be noted that the microphone and speaker arrays described above may be laid out in any manner desired. Further, components 406, 408, 414 and 416 are shown as being connected to control unit 402 via wireless connection 418. However, any component described herein may be connected to any other component via wired connection, wireless connection or any other connection known to one having ordinary skill in the art. Additional components that may be part of system 400 are telephone 420, precedence speaker 422, media source 424, video codec 426 and audio recorder 428. Any of a variety of other components may be included in system 400, for example telephone circuits, auxiliary speakers, built-in sound systems and audiovisual equipment.

FIG. 5 shows another exemplary embodiment of a communication system that may be used with the system shown in FIG. 4. Similar to the exemplary embodiment described in FIG. 2, communication device 100 may have segments 202-216. Additionally, communication device 100 can have any number of microphones, such as microphones M1-M4, and any number of speakers, such as speakers S1-S4. However, in this exemplary embodiment, an audio signal may be generated by any of a variety of remote communication devices. The remote communication device that generates the signal may be, for example, presenter's device 404, panel device 410 or 412 or any other type of communication device, for example a telephone or other remotely located device capable of generating audio signals, including communications devices 406, 408, 414 and 416. A generated audio signal may be transmitted to communication device 100 via any type of connection, for example a wired or wireless connection. When a generated audio signal is received by communication device 100, processing or logic within communication device 100, for example DSP, may perform any of a variety of functions, for example routing the audio signal to speakers S1, S2, S3 and S4 and producing audio outputs 510, 512, 514 and 516. A generated audio signal may also be sent to any other speakers disposed on or coupled to communication device 100. Also, at the same time, DSP may deactivate microphones M1, M2, M3, M4, for example, by deactivating them or muting them, thereby preventing any audio inputs, for example inputs 502, 504, 506 and 508 from being converted into audio signals by microphones M1-M4, respectively.

This exemplary embodiment, however, may allow a person speaking, for example a person speaking at presenter's communication device 404 or panel unit 410 or 412, or any other communication device located remotely from tabletop communication devices 406 and 408, as well as other communication devices, to speak into a microphone at presenter's communication device 404 or panel unit 410 or 412 and have the audio signal outputted at communication devices 406 and 408, as well as any other communication devices. Additionally, this embodiment may allow a person speaking at presenter's communication device 404 to speak without interruption as other communication devices, such as tabletop communication devices 406 and 408.

The present invention also includes a DSP system that provides for automatic adjustments to the audio system, to compensate for the acoustics in a meeting room, arrangement of audience arrays and "precedence speakers" in a meeting room, including both between arrays and between arrays and the precedence speakers, audio signal volume levels and equalization, and the differences in characteristics of a verbal input.

The audio system may accommodate a variety of portable speakers to be used as precedence speakers 718. To provide consistent quality and high intelligibility, the DSP system of the present invention automatically analyzes precedence speakers and adjusts the equalization within pre-determined parameters. This is accomplished by positioning a test microphone a set distance from and in front of the precedence speaker with a communication device 100 alongside. The control unit sends a test signal to the precedence speaker and the signals from the tabletop microphones in the communication device 100 are compared to the signal from the test microphone. The system adjusts the equalization for the test microphone to be within pre-determined parameters, optimizing system performance and intelligibility.

The DSP system may also be adapted to automatically calibrate the microphones from the presenter's communication device 404 or microphone of another communication device 100 based on predetermined parameters and the comparison of test signals. In this regard, the frequency response of the system is optimized to maximize intelligibility of the spoken word, using the standard microphones specified for the system. Preset equalization curves are selected and matched to the microphone(s) used by the presenter.

In the event a presenter wishes to use a microphone that is not included in the pre-defined presenter's communication device 404, the DSP system is able to calibrate itself to the selected microphone. This is similarly accomplished by positioning the new microphone a set distance from and in front of the precedence speaker with a communication device 100 alongside. The control unit sends a test signal to the precedence speaker and the signals from the communication device microphones are compared to the signal from the new microphone. The system adjusts the equalization for the new microphone to be within pre-determined parameters, again optimizing system performance and intelligibility.

The DSP system of the present invention may also be adapted to automatically adjust volume levels throughout the audio system to provide maximum gain before feedback. After the communication devices 100 are distributed in the meeting room, a test signal is generated through the precedence speaker(s), and through each of the communication devices 100 to excite the reverberant space of the room. Each set of communication device microphones are turned on and incrementally increased in level while the frequency response is monitored. When a sine wave oscillation is detected (feedback), the frequency of the oscillation is attenuated to reduce feedback. This process repeats several times for each communication device 100.

The preferred DSP system may also analyze and compensate for the room background noise by monitoring and analyzing levels and character of the background noise from connected microphones on tabletop communication devices 100 in an unoccupied meeting room. The system may then compensate for the room background noise, ensuring that the vocal frequencies are emphasized above the background noise.

As another aspect of the invention, the system may be adapted to provide a psychoacoustic precedence effect to make the listeners feel that the sound from the presenter is coming from the presenter rather than the communication device 100 on the table at which the listener is seated.

Figure 7:
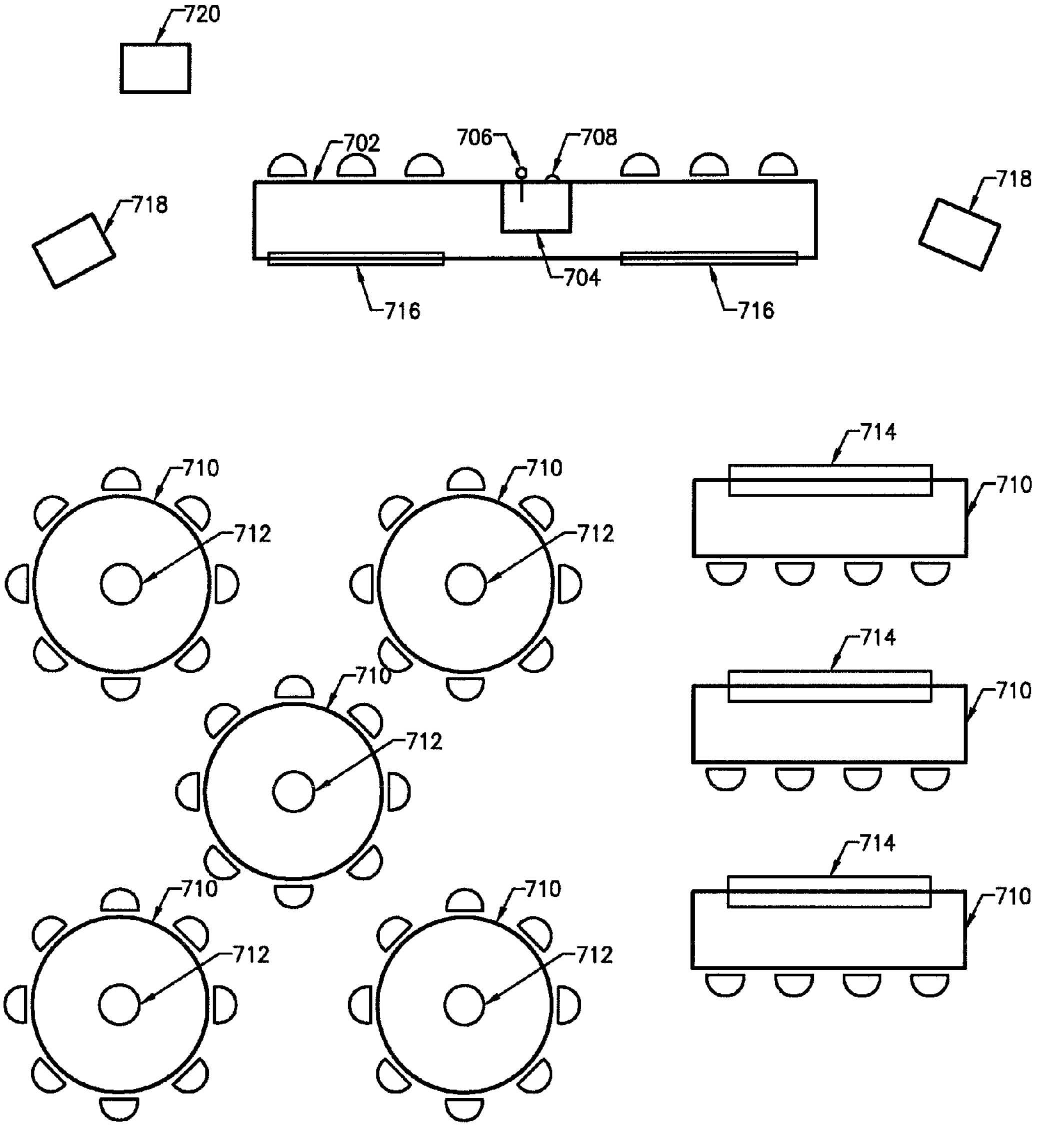
FIG. 7 is exemplary diagram a communication device in a meeting facility environment.

Typically, when portable sound systems are used with speakers on stands in the front of the audience, the persons seated nearest the speakers 718 get the loudest sound and the persons furthest away get the lowest level sounds, in addition to effects of room reverberation and possible echoes. This reduces intelligibility and listener perception of quality. When designed to be used with precedence speakers as shown in FIG. 7, intelligibility can be significantly improved with the present invention by delaying the communication devices 10 about the room relative to the portable speakers 718.

Moreover, the present system can create the perception that the sound is coming from the visible source rather than from the communication device 100 on the listener's table itself. This is accomplished by creating a psychoacoustic phenomenon called the "Haas Effect," wherein when a human listener hears the sound first from a particular direction, and then from the speaker that is closer, so that the listener will not be aware that the nearer speaker is even on. The nearer speaker may be up to 10 dB louder than the first point source or precedence speaker without the listener realizing it.

In keeping, the present DSP system automatically provides the aural illusion of a direct sound field coming from the originating speaker while maintaining even and high quality sound reinforcement throughout the audience area. This is accomplished with a test signal generated by the Control Unit that the communication devices 100 listen for. The communication devices 100 report back to the DSP in a sequence as the test signal travels from the precedence speaker across the room to the farthest communication unit 100. The DSP processors in both the control unit and communication devices 100 select an appropriate amount of signal delay according to a look-up table stored within the system.

The delay can be applied to the speakers in the communication devices 100 on the tables as well as the precedence speakers 718. The speakers in each communication device 100, in turn according to the control unit, sounds a test signal which is "heard" by the other communication devices 100, and the appropriate amount of delay is applied to each, based on which unit is originating the signal. Thus, when a participant speaks at one of the table top communication units 100, their voice is slightly delayed across all of the other communications devices 100 in the room according to the distance from the originating communication device 100.

The time and distance information from the testing described above also provides sufficient distance information for the control unit to draw a map of the room full of communication devices 100, relative to each other and relative to the presenter's communication device 404. This map is displayed, preferably on a touchscreen, on the presenter's communication device 404 and may be used to show the presenter which communication device 100 is active. It thereby provides a means for the presenter to touch the screen and activate the microphone(s) of a communication device 100 for presentation to the presenter and/or the room.

Additionally, in some further exemplary embodiments, the outputting of audio signals and the deactivation of microphones on a communication device may be performed manually or automatically. For example, if a person begins speaking on presenter's communication device 404, an audio signal may be generated and distributed to a variety of remotely located communication devices, as described previously. However, when an audio signal is generated, for example at presenter's communication device 404, control unit 402 or any other processing device or logic, may automatically deactivate any other active microphones present on devices to which the audio signal is being distributed. Similarly, when there is no longer an audio signal being generated or when there is not an audio signal being distributed to any remote communication devices, control unit 402 or any other processing device or logic may reactivate any previously deactivated microphones. In other exemplary embodiments, presenter's communication device 402 or any other device many include a user-controllable function that is able to mute or activate any remotely located microphones.

Figure 6:
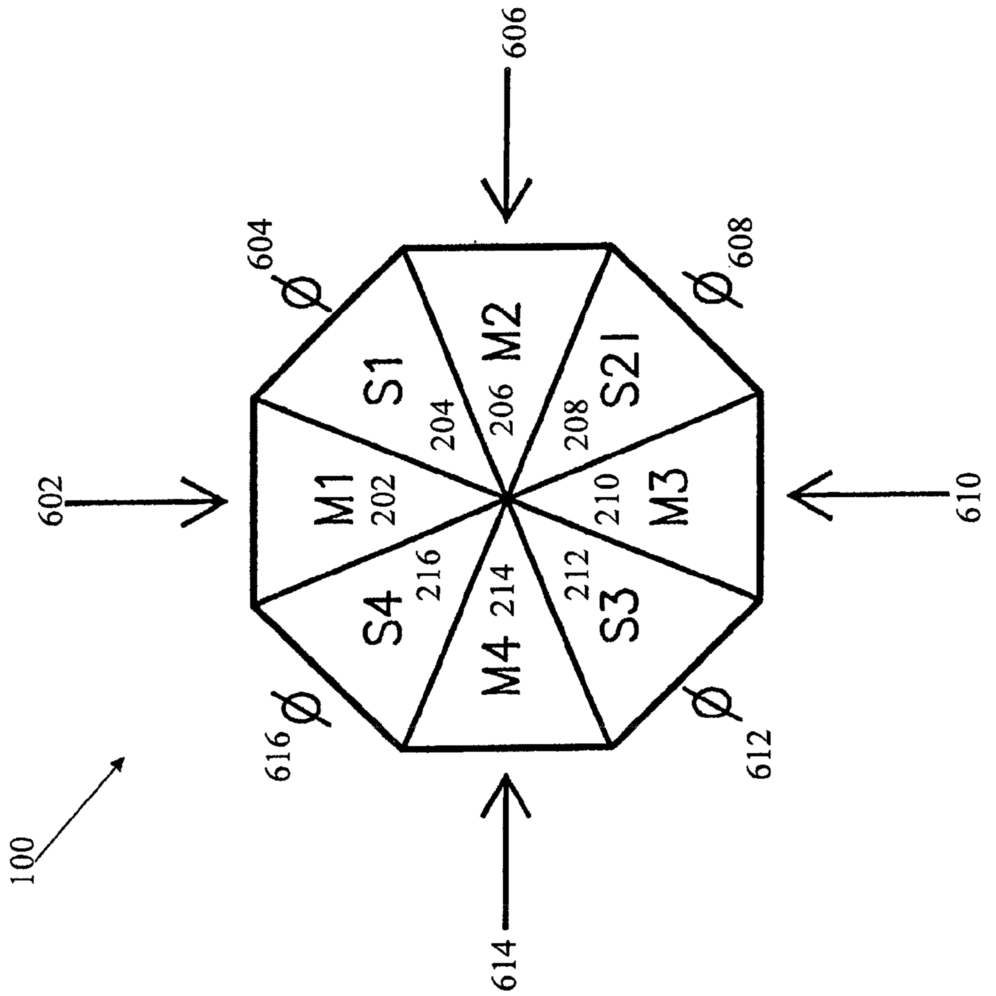
FIG. 6 is another exemplary diagram showing signal inputs and outputs from a communication device.

In another embodiment of the invention, as shown in FIG. 6, a presenter, for example located at presenter's communication device 404, may complete his or her discussion or presentation or otherwise finish speaking. In this exemplary embodiment, the presenter may desire to allow questions from any other people that may be present and may therefore desire to reactivate or un-mute the microphones disposed on any remote located communication devices, for example tabletop communications devices 406, 408, 414 and 416 and panel communication devices 410 and 412. In some exemplary embodiments, the reactivation or un-muting of any remotely located microphones may be performed automatically by control unit 402 or some other logic if the presenter at presenter's communication device 404 is no longer speaking. Upon activation, an audience member located at any one of the remote communication devices 406, 408, 414 or 416 or panel communication devices 410 or 412 may speak into a microphone to address the presenter and/or the other audience members. In a further embodiment, the audio signal generated at the remote communication devices 406, 408, 414 or 416 or panel communication devices 410 or 412 may be transmitted through control unit 402 to presenter's communication device 404, where it may outputted by a microphone disposed in presenter's communication device 404, as well as to any other desired speaker in a communication device or otherwise situated. The presenter situated at presenter's communication device 404 may then respond to the audience member while once again deactivating or muting the remotely located microphones, as discussed in previous embodiments and with respect to FIG. 5.

As shown in FIG. 6, and similar to previous embodiments, communication device 100 may have segments 202-216. Additionally, communication device can have any number of microphones, such as M1-M4, and any number of speakers, such as S1-S4. However, in this exemplary embodiment, there may not be an incoming audio signal from a remote device or an incoming signal from a remote device may be muted. Thus, any inputs, such as inputs 610, 612, 614 and 616 may not be outputted on any of speakers S1, S2, S3 or S4, respectively. Instead, if a presenter, such as a presenter at presenter's communication device 404, requests or otherwise desires feedback or questions from one or more people who may be situated near communication device 100, all of the microphones, for example microphones M1-M4 disposed on communication device 100, may be activated. Alternatively, microphones M1-M4 disposed on communication device 100 may remain activated, for example if there was a discussion amongst people situated near communication device 100 and no audio signal from a remote device was being fed to communication device 100 or any of speakers S1-S4. Thus audio signals could be generated at any one of microphones M1-M4 and could be transmitted through control unit 402 and outputted at any other communication device, for example presenter's unit 404 or any other communication device so that persons located remotely from communication device 100 may hear.

An exemplary embodiment of the communication system 400 described above, illustrated in its contemplated setting in a conference room, is shown in FIG. 7. A dais or presenter's table 702 is located at the front of the conference room with the presenter's communication device 704 in the center, as generally arranged. As described, the presenter's communication device includes a microphone 706 and at least one speaker 708 for the presenter to communicate with the participants. A number of tables 710 having circular or linear tabletop communication devices 712 or 714 thereon are arranged around the conference room for the participants to sit around or at, as generally provided in conference rooms. Precedence speakers 718 may be used to provide the audio signals to the entire room, supplementing the audio signals provided at the tabletop communications devices 712 or 714, panel communication devices 716 and/or presenter's communication device 704, as desired, with control unit 720 processing and controlling the routing of audio signals and other data to various components of the system.

In further exemplary embodiments, if all of microphones M1-M4 are active and an audio signal is generated by one of the active microphones, the other active microphones may be deactivated. For example, if an audio signal is generated at microphone M1, microphones M2, M3 and M4 may be deactivated. Additionally, any deactivated microphones may be reactivated when an audio signal is no longer being generated at microphone M1. In other exemplary embodiments, at the completion of the generation of an audio signal, all of microphones M1-M4 may be deactivated or muted to allow a person using any other communication device to speak or reply.

In still other exemplary embodiments, a microphone or microphones may be automatically or manually activated. For example, in one embodiment, control unit 402 may detect when a person is speaking into a microphone, for example a microphone at presenter's communication device 404 and may automatically mute or deactivate any or all of the microphones located at any other communication devices. In another exemplary embodiment, a person at presenter's communication device 404 may have the ability to manually activate and deactivate any desire microphones. For example, if a person at presenter's communication device 404 notices that a person sitting proximate, for example, to communication device 406, has a question to ask the person at presenter's communication device 404, the person at presenter's communication device 404 may be able to manually activate the microphone closest to the person.

Also, in a further exemplary embodiment, if a person at presenter's communication device 404 wishes to mute or deactivate a remote microphone housed in a remote communication device, he or she may manually deactivate that microphone. For example, if a person is asking too long of a question or if the microphone is malfunctioning, a person at presenter's communication device deactivate or mute a specific microphone. The deactivated or muted microphone may be reactivated or unmuted in any of the exemplary manners described herein.

In still other exemplary embodiments, the activation and deactivation of any components housed on any communication devices may be automatic. For example any or all of the microphones or speakers may be activated or deactivated by control unit 402 or by any control unit, logic or processor housed on an individual communication device. Additionally, in some exemplary embodiments, any automatic activation or deactivation of any of the microphones or speakers found on any communication device may be manually overridden by a person. For example, a person at presenter's communication device 404 may have the ability to manually activate or deactivate any component found on any other communication device, which may override a previous command by control unit 402 or by any other control unit, logic or processor housed on an individual communication device.

In still other further embodiments, the activation or deactivation of a microphone may be shown through the use of an indicator or display. For example, if a microphone on a communication device is activated, a green LED on a communication device, such as communication device 406, may be powered and may symbolize that the microphone is activated. Also, a red LED on a communication device, such as communication device 406, may be powered to symbolize that a microphone has been deactivated. In still other exemplary embodiments, a communication device, such as communication device 406, may include a display, such as a liquid crystal display or any other display known to one having ordinary skill in the art, which may be used to communicate to a user that a microphone, or any other component thereon, is activated or deactivated.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

The invention claimed is:

1. A method of distributing an audio signal corresponding to a verbal input between a presenter and an audience at a plurality of tables in a meeting facility, comprising:

generating an audio signal corresponding to a verbal input by a microphone on one of a presenter device and an audience array, said audience array being one of a plurality of audience arrays on one of a plurality of tables in a meeting room, each of said presenter device and audience arrays having one or more microphones one or more speakers incorporated therein;

processing the audio signal by a digital signal processor adapted to automatically adjust and compensate for one or more of the acoustics in a meeting room, the arrangement of audience arrays and speakers in a meeting room, audio signal volume levels and equalization, and the differences in characteristics of a verbal input;

creating a psychoacoustic precedence effect with the digital signal processor by generating a test signal from a control unit, sending this test signal to one or more of the audience arrays, and providing feedback to the digital signal processor to create a signal delay; and transmitting the generated audio signal to a speaker located remotely from the location of the presenter device or audience array containing the microphone where the audio signal corresponding to verbal input was generated.

2. The method of claim 1, further comprising directing the audio signal generated by a microphone on the audience array to one or more speakers on that audience array substantially remote to the microphone that generated the audio signal.

3. The method of claim 1, further comprising disabling one or more speakers located substantially adjacent to the microphone on the audience array that is generating an audio signal.

4. The method of claim 1, further comprising automatically determining the microphone generating the audio signal and automatically disabling at least one of the microphones on the audience array, at least one of the speakers on the audience array, at least one of the speakers on the presenter device, at least one of the microphones on one or more of the other audience arrays and at least one speaker of the one or more remote speakers.

5. The method of claim 1, further comprising processing audio signal by providing one or more of level adjustment including compression, limiting, expansion and automatic gain control, noise attenuation, noise gating, muting, automatic microphone mixing, echo cancellation, bandpass equalization, signal routing and combinations of the above.

6. The method of claim 1, wherein preventing the generation of other audio signals is performed by automatically disabling one or more microphones substantially remote from the origin location of the audio signal.

7. The method of claim 1, wherein preventing the generation of other audio signals is performed by manually disabling one or more microphones substantially remote from the origin location of the audio signal.

8. The method of claim 1, further comprising distributing the audio signal to speakers located substantially opposite the microphone generating the audio signal on a radial array.

9. The method of claim 1, wherein the generated audio signal is transmitted via a wireless connection to a speaker located remote from the microphone generating the audio signal.

10. The method of claim 1, further comprising processing audio signal with a digital signal processor based on the equalization of connected speakers.

11. The method of claim 1, further comprising processing audio signal with a digital signal processor based on audio signal volume levels and equalization.

12. The method of claim 1, further comprising processing audio signal with a digital signal processor based on different voicing characteristics of verbal input.

13. The method of claim 1, further comprising processing audio signal with a digital signal processor based on the equalization settings from the microphone generating the audio signal.

14. The method of claim 1, further comprising processing audio signal with a digital signal processor based on the equalization settings from the microphone generating the audio signal.

15. The method of claim 1, further comprising processing audio signal with a digital signal processor based on the feedback detection.

16. The method of claim 1, further comprising processing audio signals with a digital signal processor based on meeting room background noise.

17. The method of claim 1, further comprising processing audio signals with a digital signal processor with a delay based on the distance from a microphone on one of a presenter device and an audience array and one or more speakers.

18. The method of claim 1 wherein the digital signal processor is adapted to automatically analyze connected speakers and adjust the speakers to compensate for different speaker voicing characteristics by comparing responses to test signals from connected microphones with a pre-defined response based on predetermined parameters.

19. The method of claim 1 wherein the digital signal processor is adapted to automatically calibrate microphones receiving the audio signal by selecting preset equalization curves that are matched to one or more microphones receiving the audio signal.

20. The method of claim 19 further comprising a comparison of test signals to connected speakers and from connected microphones with signals from one or more microphones receiving the audio signal based on predetermined parameters.

* * * * *